Nov. 29, 1949 A. B. FROST 2,489,408
FINGER BOARD FOR STRINGED MUSICAL INSTRUMENTS
Filed Feb. 23, 1946
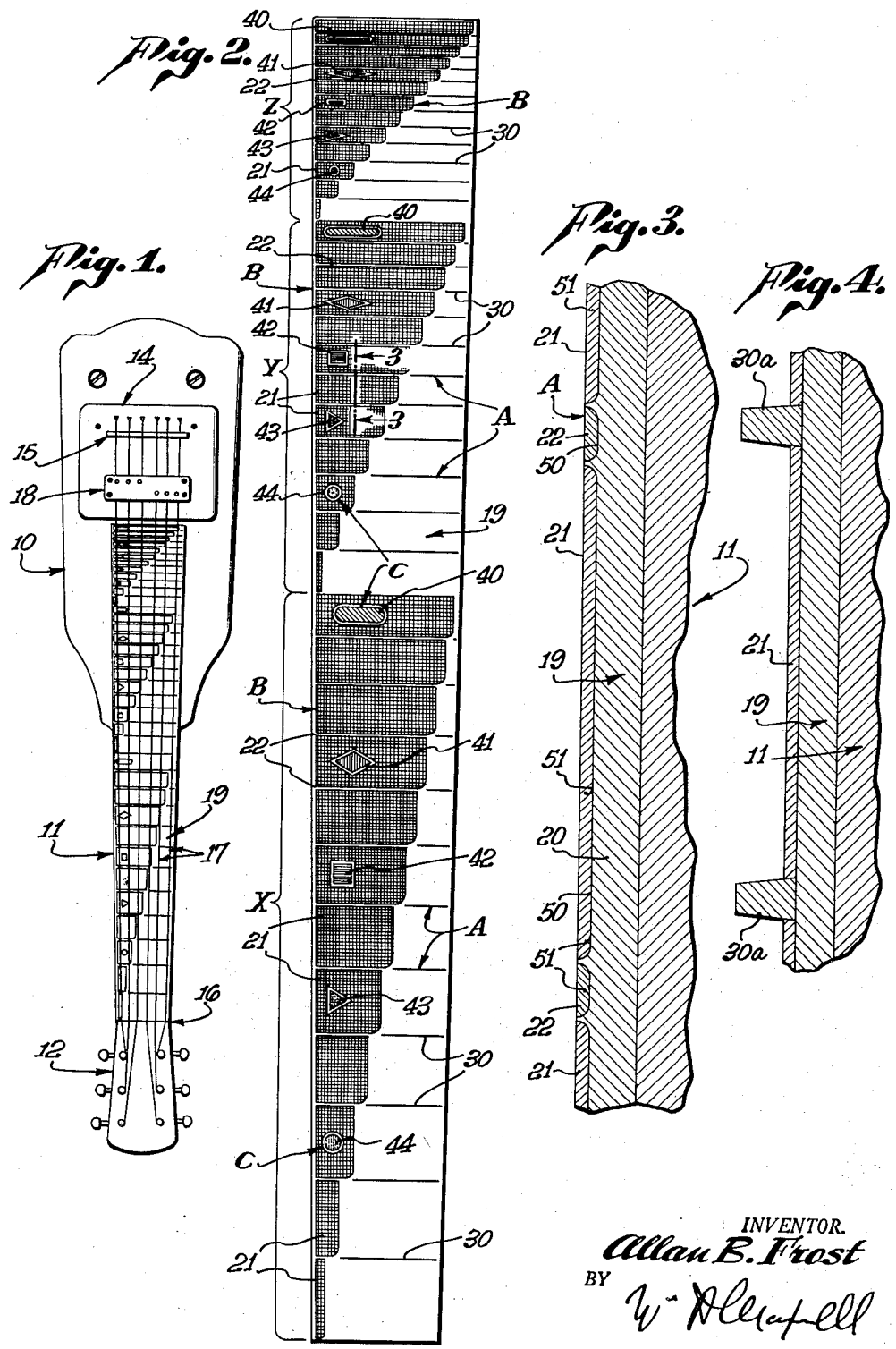
INVENTOR.
Allan B. Frost
BY
ATTORNEY Patented Nov. 29, 1949

2,489,408

UNITED STATES PATENT OFFICE 2,489,408

FINGER BOARD FOR STRINGED MUSICAL INSTRUMENTS

Allan B. Frost, Chicago, Ill.

Application February 23, 1946, Serial No. 649,471

13 Claims. (Cl. 84—314)

This invention has to do with a finger board for a stringed musical instrument and is more particularly concerned with a finger board of that type of instrument known, generally, as a Hawaiian guitar, although it is applicable, generally, to a wide range of different stringed instruments. It is a general object of the invention to provide a finger board for an instrument of the character mentioned which incorporates visual means to aid a person in learning to play the instrument.

The finger boards of Hawaiian guitars and the like have been derived from the Spanish guitar finger boards with the usual frets having been retained to locate the certain finger positions. Finger boards of such instruments have been made with limited markings, and in some cases numerals or the like have been applied in a series down the middle of the board to mark or designate certain positions. Generally speaking, however, finger boards of instruments of the character mentioned, as heretofore provided, have not been such as to materially aid a player or to simplify the location of proper finger or steel positions for a beginner. It is to be understood that when I refer to a finger position as used on Spanish guitars I also contemplate the position of a steel as used with the Hawaiian guitars or any other like element or instrument. When I use the term finger board I do not mean to restrict myself to a board actually engaged by the fingers of the player, but I mean to include a board such as occurs beneath the strings of a Hawaiian guitar in which instrument the strings as well as the fingers of the player and the steel used in playing are at all times clear of the board beneath the strings.

It is a general object of my present invention to provide a finger board for an instrument of the character mentioned with visual means whereby a person can readily and accurately locate finger or steel positions at the several octaves occurring along the board.

Another object of the invention is to provide a finger board of the general character referred to involving a plurality of different visual means that facilitate the location of finger or steel positions along the board.

A further object of my invention is to provide a finger board of the general character referred to involving visual means marking octaves so that the several octaves can be readily distinguished and also identifying individual notes in the octaves.

Another object of my invention is to provide a finger board of the general character referred to having visual means identifying corresponding notes in different octaves.

It is a further object of my present invention to provide visual means indicating to a player the direction in which the hand must be moved to raise or lower the tone or, in other words, to gain higher or lower notes.

Another object of my invention is to provide a finger board of the general character referred to involving a plurality of visual means to facilitate the location of finger or steel positions, all of which means are located on the finger board to be visible at all times as the instrument is being played.

The various objects and features of my invention will be fully understood from the following detailed description of a typical preferred form and application of the invention, throughout which description reference is made to the accompanying drawings, in which:

Fig. 1 is a top plan view of a typical instrument involving the scale provided by this invention. Fig. 2 is an enlarged plan view of the finger board of the instrument shown in Fig. 1. Fig. 3 is an enlarged detailed sectional view taken substantially as indicated by line 3—3 on Fig. 2, and Fig. 4 is a sectional view similar to Fig. 3 showing a modified form of the invention.

The finger board provided by this invention can be used in or applied to various stringed musical instruments. For purpose of example I have shown it applied to that type of instrument known, generally, as a Hawaiian guitar and, further, have shown it as applied to such a guitar wherein there is an electrical pick-up so that the instrument is suitable for use in conjunction with an amplifying set.

The particular instrument illustrated, involves, generally, a body 10, a neck 11 projecting from the body, a plug head 12 at the outer end of the neck, a tail piece 14 carried on the body, a bridge 15 at the body, a nut 16 where the plug head joins the neck, and a plurality of strings 17 strung between the tail piece 14 and the plug head 12 and extending between the bridge 15 and the nut 16. The particular instrument shown has an electrical pick-up unit 18 carried by the body and suitably related to the strings 17 and it includes a finger board 19 which extends lengthwise of the instrument extending the length of the neck 11 and over a part of the body 10, this element being the part or unit incorporating the present invention.

In accordance with the broader aspects of my invention the finger board may be formed by the top parts or surfaces of the neck and suitable parts of the body or it may, as shown in the drawings, be formed of a separate or individual strip of material 20 applied to the top of the neck and over a portion of the body so that it extends in the desired manner beneath the strings 17, preferably from the nut 16 toward the bridge 15 as far as it is practical to play the strings. In practice where the finger board is formed of a separate body 20 this body can be of any suitable material, for instance, it may be advantageously formed of metal such as brass, as such material readily lends itself to being etched and variously colored, as I will hereinafter describe. The particular finger board illustrated in the drawings is shaped and proportioned in the manner common to Hawaiian guitars and is somewhat tapered being narrowest at the point where it adjoins or is adjacent the nut 16.

By my present invention I provide the finger board or at least the upper visible surface of the finger board with a plurality of transverse markings A which divide it into notes of one or more scales or octaves, extending lengthwise of the finger board. In the case illustrated I have shown a finger board with transverse markings A variously spaced lengthwise of the finger board to divide it into three ordinary or conventional scales or octaves X, Y and Z, which scales adjoin each other and occupy the length of the finger board. I have shown, for example, each scale as an ordinary musical scale, such as is well known in occidental countries, and which involves seven full notes and five half notes. The transverse markings A may be of any desired form or extent, both transverse of the scale and longitudinally of the scale, it being preferred that they be established to appear, in effect, as lines extending completely across the finger board from one edge portion to the other, and that they be sufficiently heavy so that they are readily visible. I will refer to these transverse markings as fret markings as they are located and appear generally as do the frets on fretted finger boards.

Further, in accordance with my invention I provide the finger board with markings B of distinctive patterns designating or differentiating, generally, the several scales or octaves of the board. There is a marking B at or for the scale X, one for the scale Y, and one for the scale Z, and these markings are such that they are readily distinguishable at the points where they adjoin and are formed so that they designate or indicate the manner in which the scales run or progress. In the preferred form of the invention illustrated the scale markings B, as I will call them, are each generally triangular in form, being composed of a plurality of individual marks 21 each of which individual marks is confined between adjacent fret markings and extends an appreciable amount transversely of the finger board. The several marks 21 of each scale marking B vary in transverse extent and they progress in transverse extent from one end of the scale to the other so that the widest marking or the one of greatest extent occurs a one end of the scale, while the narrowest marking or the one of least transverse extent occurs at the other end of the scale.

The several marks B are arranged so that they all adjoin one edge of the finger board, preferably the edge remote from the player when the instrument is in use, so that all of the marks 21 of a scale of the finger board combine to form, in effect, a right-angle triangle, the hypotenuse of which is stepped somewhat, because of the individual formation of the marks, although it is, in effect, a straight line extending the length of the scale. The marks 21 of the several scales X, Y and Z are correspondingly arranged but form triangles of different shapes due to the fact that the scales X, Y and Z are of different lengths, as clearly shown in the drawings, the scale X at the outer end of the finger board being considerably longer than the scale Z at the innermost end of the board.

In accordance with my invention the marks 21 forming the scale markings B differ in color or appearance from the balance of the finger board so that they are readily identified by the user, for example, they are colored to distinctly contrast with the rest of the finger board or, in practice, they can be made black or gray, while the balance of the board is white, or of some other light color. In practice I find it advantageous to divide the several marks 21 or to separate adjacent marks 21 by a narrow space so that the spaces or lines 22 between such marks 21 form parts of the fret markings A. In this case, as shown in the drawings, the fret markings A may be continued across the finger board, where the scale markings 21 do not occur, by providing suitable transverse lines 30 on the finger board.

In accordance with my invention I provide means for distinguishing the several scale markings B so that they can be readily distinguished by means other than by their difference in length or by means other than their difference in shape. For example, I may, if desired, employ contrasting tones in forming the several scale markings B, for instance, if a color is employed I can employ three shades of such color. For example, if blue is employed, the scale marking at one end of the finger board can be a very dark blue, the scale marking B at the other end of the board may be a medium shade of blue, while the scale marking between the two ends can be of an intermediate tone. It will be apparent that such tonal gradation can be employed in connection with any character of marking employed for the scale markings B.

My invention further provides means designating particular notes in the scales X, Y and Z, or in other words I provide note markings C. In carrying out my invention, when employing the scale illustrated in the drawings I provide five note markings in each scale. I prefer to differentiate between the note markings of each scale, for instance, as shown in the drawings, I provide each scale with a note marking 40 which is generally rectangular in form, a note marking 41 which is diamond shaped, a note marking 42 which is square, a note marking 43 which is triangular and a note marking 44 which is round. The note markings are thus distinguished by reason of their shapes. In addition to such differentiation I preferably color the several note markings just referred to so that they are readily distinguishable. For instance the note marking 40 may be green, the note marking 41 may be red, the note marking 42 may be blue, the note marking 43 may be yellow and the note marking 44 may be purple. Thus the individual note markings in each scale are differentiated both by shape and color. I prefer, in practice, to locate the several note markings in the markings 21 so that they occur adjacent the edge of the finger board remote from the user. In practice I coordinate the note markings of the several scales X, Y and Z by making the note markings of the several scales so that they correspond, that is, where I have three like scales I provide like note markings, that is, note markings alike both as to arrangement, shape and coloring, so that a person playing the instrument can readily recognize or relate corresponding note positions on the several scales.

In carrying out the present invention I can apply markings to the face of the surface of the body 20 of the finger board, or I may, as indicated in Fig. 3, etch recesses 50 into the finger board where markings are to occur and can fill pigment, enamel, or coloring matter 51 into the etched out parts, all to the end that the final or finished board has a smooth surface or face bearing the various markings, which are distinguished as to size, spacing, shape, color, etc.

Fig. 4 shows a modified form of construction that can be employed when it is desired that the finger board have frets projecting above the normal plane of the surface or face of the board. In this modified form of construction the fret markings, instead of being mere marks visibly distinguishable, as above described, are projecting parts 30ᵃ which are in the nature of ribs or ridges actually projecting above the adjoining surfaces of the board. Such fret ridges or ribs also serve as dividers or separating means occurring between other markings of the board.

With the finger board that I have provided a person undertaking to learn to play the instrument can be readily given instructions based on any or all of the markings appearing on the finger board, and the impressions made upon the person or student may vary. For instance, in one case it may be easier for a student to remember the color differentiations, whereas in another case shape differentiations may be most impressive, but in any event the several differences between them combine to the end that it is a very simple matter to readily and accurately ascertain finger or steel positions on the finger board so that operative skill is quickly developed and the person is not left to rely solely or mainly upon his ear to develop his fingering or steel positioning on the instrument.

Having described only a typical preferred form and application of the invention, I do not wish to be limited or restricted to the specific details herein set forth, but wish to reserve to myself any variations or modifications that may appear to those skilled in the art, and fall within the scope of the following claims:

Having described my invention, I claim:

1. A finger board of the character described including, fret markings extending transversely of the board and spaced apart longitudinally of the board, and areas of contrasting color tones on the board between fret workings forming scale markings in a series end to end lengthwise of the board, there being one scale marking corresponding to each octave on the board and visibly different from each of the other scale markings.

2. A finger board of the character described including, fret markings extending transversely of the board and spaced apart longitudinally of the board, and areas of contrasting color tones on the board between fret markings constituting triangular scale markings, one corresponding to each scale on the board and of contrasting sizes at their adjoining ends to be visibly different from each other.

3. A finger board of the character described including, fret markings extending transversely of the board and spaced apart longitudinally of the board, and areas of contrasting tones on the board between fret markings defining triangular scale markings in end to end relation, one corresponding to each scale on the board and of different extent transversely of the board where they adjoin each other and each having a side coincidental with a line adjacent and parallel with with a common edge of the board.

4. A finger board of the character described including, fret markings extending transversely of the board and spaced apart longitudinally of the board, and areas of contrasting tone between fret markings defining scale markings disposed end to end lengthwise of the board, one corresponding to each scale on the board and visibly different from each other and each including a plurality of individual markings extending transversely of the board and of different extents transversely of the board.

5. A finger board of the character described including, fret markings extending transversely of the board and spaced apart longitudinally of the board, and areas of contrasting tone between fret markings establishing scale markings end to end lengthwise of the board, one corresponding to each scale on the board and visibly different from each other and each including a plurality of individual markings spaced apart lengthwise of the board and of different extents transversely of the board, spaces between said individual markings forming parts of the fret markings.

6. A finger board of the character described including, fret markings extending transversely of the board and spaced apart longitudinally of the board, and scale areas of contrasting tone between frets forming markings in end to end relation, one corresponding to each scale on the board and of different widths at adjoining ends and each including a plurality of individual markings extending transversely of the board and of different extents transversely of the board, and all extending from the same edge of the board.

7. A finger board of the character described including a plurality of scale markings arranged end to end along the board and each triangular in form, each scale marking including a plurality of individual marks extending transversely of the board and various distances transversely of the board.

8. A finger board of the character described including a plurality of scale markings arranged end to end along the board and each triangular in form, each scale marking including a plurality of individual marks extending transversely of the board and various distances transversely of the board said individual marks having parallel marginal edges extending transversely of the board and spaced apart longitudinally of the board, leaving visible lines between them.

9. A finger board of the character described including a plurality of scale markings arranged end to end along the board and each triangular in form, and note markings varying in shape and designating particular notes of each scale, corresponding note markings of each scale being alike.

10. A finger board of the character described including a plurality of scale markings arranged end to end along the board and each triangular in form and having a side coincidental to a line parallel with and adjacent to one edge of the board, and note markings varying in both shape and color and designating particular notes of each scale, corresponding note markings of each scale being alike in shape.

11. A finger board of the character described including, fret markings extending transversely of the board and spaced apart longitudinally of the board, scale markings, one corresponding to each scale on the board and visibly different from each other, and note markings designating particular notes of each scale, the several note markings of each scale being visibly different.

12. A finger board of the character described including, fret markings extending transversely of the board and spaced apart longitudinally of the board, scale markings, one corresponding to each scale on the board and visibly different from each other, and note markings designating particular notes of each scale, the several note markings of each scale being visibly different both as to color and shape and corresponding note markings of the several scales being alike.

13. A finger board of the character described including, fret markings extending transversely of the board and spaced apart longitudinally of the board, and scale markings, one corresponding to each scale on the board and visibly different from each other, the fret markings being in the form of projections.

ALLAN B. FROST.

REFERENCES CITED

The following references are of record in the file of this patent:

UNITED STATES PATENTS

| Number | Name | Date |
| --- | --- | --- |
| 357,168 | Barnwell | Feb. 8, 1887 |
| 494,698 | Zorger | Apr. 4, 1893 |
| 1,188,983 | Nonfri | June 27, 1916 |
| 1,751,048 | Miessner | Mar. 18, 1930 |